Dec. 2, 1969   W. J. M. CAMPBELL   3,481,643
VEHICLE CHASSIS CONSTRUCTION
Filed Aug 23, 1967   2 Sheets-Sheet 1
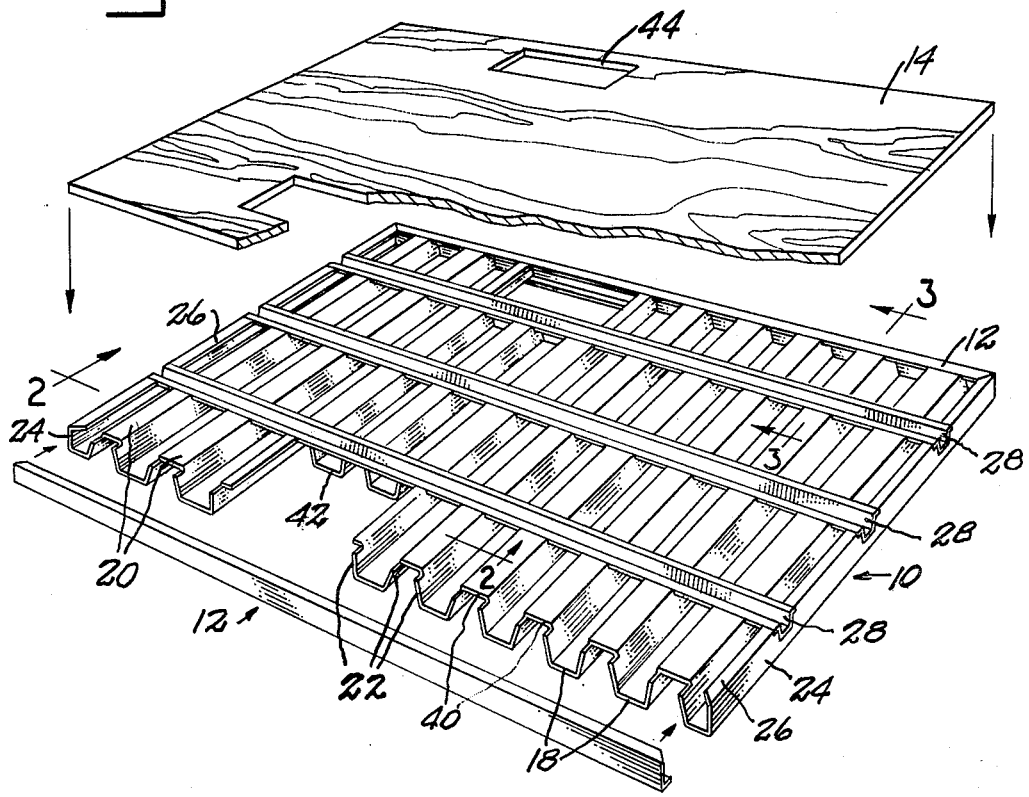
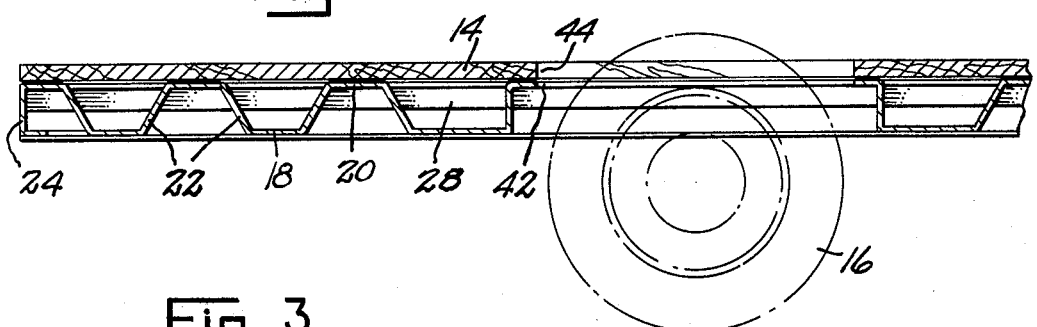
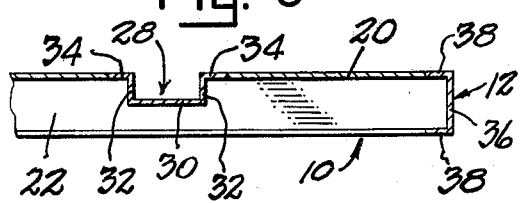
INVENTOR.
WILLIAM J. M. CAMPBELL
BY
*Eugene C. Knoblock*
ATTORNEY Dec. 2, 1969  W. J. M. CAMPBELL  3,481,643
VEHICLE CHASSIS CONSTRUCTION
Filed Aug. 23, 1967  2 Sheets-Sheet 2
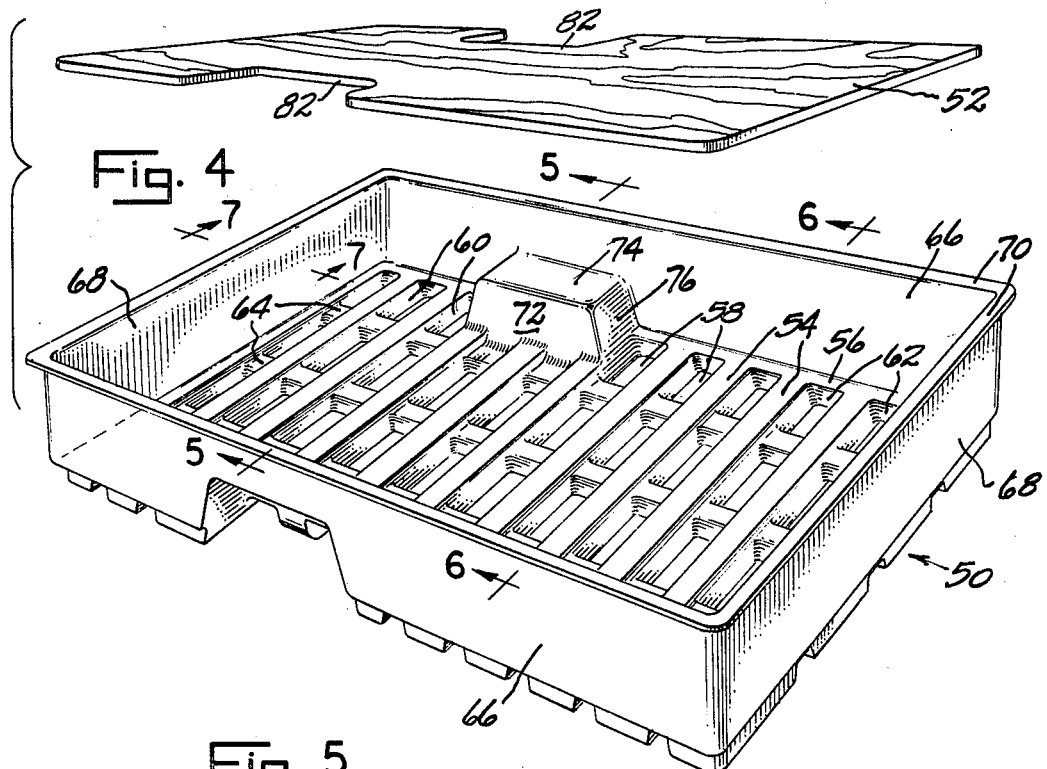
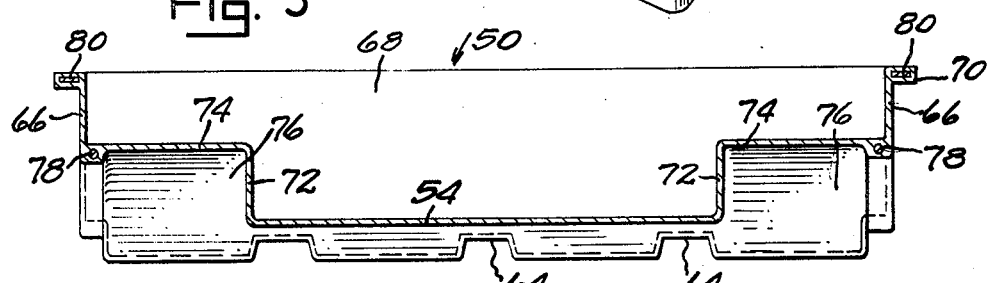
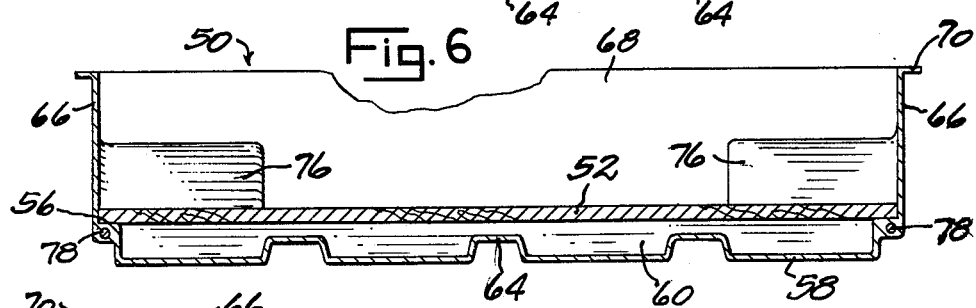
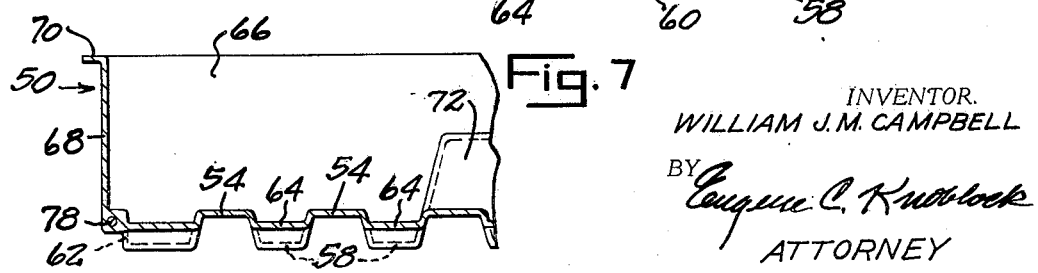
INVENTOR.
WILLIAM J. M. CAMPBELL
BY Eugene C. Knoblock
ATTORNEY United States Patent Office 3,481,643
Patented Dec. 2, 1969

3,481,643
VEHICLE CHASSIS CONSTRUCTION
William J. M. Campbell, Elkhart, Ind., assignor to Elkhart Bridge and Iron Company, Inc., a corporation of Indiana
Filed Aug. 23, 1967, Ser. No. 662,613
Int. Cl. B62d 27/00, 29/00; E04c 2/34
U.S. Cl. 296—28         4 Claims

ABSTRACT OF THE DISCLOSURE

A vehicle chassis construction formed of transversely corrugated sheet material rigidified by longitudinal corrugations interrupting said transverse corrugations and by longitudinal marginal members, wherein a floor panel is supported by and substantially continuously cemented to all surfaces of the sheet material which it contacts.

---

This invention relates to a vehicle chassis construction, and more particularly to a chassis suitable for use on small towed vehicles such as travel trailers, utility trailers or campers.

Heretofore it has been common practice in the manufacture of a chassis intended for use in a travel trailer, camper or utility trailer to construct a unit from metal structural elements and to mount thereon the other components of the desired vehicle, such as the floor, and side and end walls. This has necessitated the use of a chassis of considerable strength and weight, with resulting substantial cost for components thereof and labor to construct and assemble the chassis.

It is the primary object of this invention to provide a chassis so constructed that the vehicle floor is fixedly secured to its supporting structure in such a manner as to become a stress-sustaining element, thereby accommodating the use of chassis components or elements of less strength and weight and lower cost than has been possible heretofore.

A further object is to provide a vehicle chassis construction having interconnected transverse and longitudinal channels or corrugations and marginal members all interconnected with a floor at points of contact therewith as by bonding or cementing.

A further object is to provide a chassis which may be molded from synthetic resin material with longitudinal and transverse corrugations or channels and imbedded reinforcing means, rigidified for vehicular use by bonding of a floor panel thereto.

Other objects will be apparent from the following specification.

In the drawing:

FIG. 1 is a perspective or exploded view illustrating one embodiment of the invention.

FIG. 2 is a longitudinal vertical sectional view taken on line 2—2 of FIG. 1.

FIG. 3 is a fragmentary vertical transverse sectional view taken on line 3—3 of FIG. 1.

FIG. 4 is a perspective or exploded view illustrating another embodiment of the invention.

FIG. 5 is a vertical transverse sectional view taken on line 5—5 of FIG. 4.

FIG. 6 is a vertical transverse sectional view taken on line 6—6 of FIG. 4.

FIG. 7 is a fragmentary vertical longitudinal sectional view taken on line 7—7 of FIG. 4.

Referring to the drawings, and particularly to FIGS. 1 to 3 which illustrate one embodiment of the invention, the numeral 10 designates a chassis unit or assembly to which is secured longitudinal side frame members 12 and by which is supported a vehicle floor panel 14. The parts 10, 12 and 14 are assembled and constitute a unit which is supported by wheels 16 through suitable wheel suspension means (not shown). It will be understood that the vehicle is preferably a trailer which is provided with suitable means to connect it to a towing vehicle, which means may include a longitudinally forwardly projecting A-frame (not shown) adapted to carry a hitch member of any conventional or known type.

The chassis unit 10 preferably constitutes a corrugated member, preferably formed of sheet metal. However, it may be formed of plastic material if desired. The corrugated member is preferably of substantially uniform configuration throughout, with corrugations extending transversely thereof and being characterized by uniformly spaced bottom horizontal parts 18, top horizontal parts 20 and intervening upright or substantially upright parts 22. Each end of the unit 10 preferably constitutes an upright end wall 24 having a horizontal terminal flange 26. It will be understood that each of the top horizontal corrugated parts 20 is arranged in a common plane and preferably is parallel to the bottom horizontal corrugations 18. Also, where the terminal flanges 26 are located at the tops of the end walls 24, the same will be coplanar with the top horizontal corrugation parts 20.

The corrugated unit 10 is reinforced in a longitudinal direction by means of one or more comparatively shallow longitudinally extending channels 28. In the preferred arrangement the upper part of each of the transverse corrugations of the unit 10 at a selected transverse location is cut away to accommodate seating of a channel member 28 therein. Each channel 28 preferably includes a bottom web 30, side walls 32 and out-turned longitudinal marginal flanges 34, the cut-aways or notched parts of the corrugations of the unit 10 preferably corresponding in shape to and snugly receiving the channels 28 as illustrated in FIG. 3. Each channel 28 is welded or bonded at each corrugation to the parts which it contacts. Where multiple longitudinal channels 28 are provided they are suitably spaced to strengthen and rigidify the corrugated parts as required for the type of vehicle to be built or mounted thereon.

The longitudinal side frame members 12 preferably constitute metal channels each having an upright web 36 and top and bottom legs 38. The ends of the top horizontal corrugation parts 20 are preferably cut-away at 40 so that the top channel legs 38 may seat therein to lie flush with the top corrugation parts 20. The channels 12 are welded or bonded to the unit 10 at contacting parts thereof.

In the event it is desired to provide wheel wells or openings in the unit to accommodate wheels positioned as illustrated in FIG. 2, cut-aways may be formed at 42 within the unit 10 at opposite sides thereof and preferably between a side channel 12 and a longitudinal reinforcing channel 28. In register with such cut-aways 42 are openings 44 formed in the floor panel 14.

After formation of the unit 10 with its reinforcing chanels 28 and side frame members 12 welded or bonded to the corrugated sheet, the chassis unit is completed by bonding or cementing a floor panel 14, such as a plywood panel or a rigid plastic panel or a composition panel of suitable rigidity and strength, to the underlying structure. For this purpose, an epoxy cement may be utilized, and preferably the bonding will occur at all points of surface contact of the floor panel with parts of its underlying supporting structure. Thus, the cementing or bonding of the floor to the supporting structure will preferably occur throughout the top surface areas of the top corrugation parts 20, the flanges 34 of the members 28 and the top channel legs 38 of the longitudinal side frame members. Also, where terminal flanges 26 at the ends of the unit 10 lie in the plane of the top horizontal corrugation parts 20, bonding or cementing of the floor panel 14 will occur therealong in the preferred construction.

The construction described above is characterized by light weight, by longitudinal strength imparted by the reinforcing channels 28 and the side frame panels 12, and by transverse strength imparted by the transversely extending corrugations consisting of the parts 18, 20 and 22. Further, strength and rigidity is imparted by the bonding or cementing of the floor 14 to its supporting member, so that the floor becomes a stress-sustaining part of the chassis. This is to be distinguished from prior constructions wherein floor members are bolted or otherwise secured at spaced points to a frame structure, particularly where the bonded or cemented relationship of the floor to supporting parts occurs at all or substantially all contacting areas therebetween. Stated differently, the floor 14 becomes a stress-sustaining skin, as distinguished from a simple securement, and it forms a part of the frame and materially increases the strength of the chassis.

In the event a water-tight chassis is desired, having floatation properties which render buoyant the chassis and the vehicle of which it forms a part, or in the event it is desired to further unitize the chassis, a construction of the character illustrated in FIGS. 4–7 may be provided. In this construction, the chassis is formed principally from a single molded unit 50 and floor 52.

The molded unit 50 is preferably substantially cup-shaped, having integral bottom, side and end walls molded as a unit from synthetic resin sheeting material, such as "Royalex," or from a tough gum plastic made from plastic resin and synthetic rubber, such as "Royalite." It will be understood, however, that any suitable synthetic resin having the properties of strength, toughness and the like required, may be utilized. The bottom of the chassis unit 50 is preferably configured to provide intersecting ridges, as in the waffle-like configuration illustrated and is characterized by coplanar transversely extending ridge on corrugation portions 54 which are substantially uniformly spaced throughout the length of the body and are coplanar with longitudinal marginal shoulder parts 56. Low level bottom transverse parts 48 are formed between the ridge parts 54 and are joined thereto by integral transverse substantially upright parts 60 and end upright parts 62. Longitudinally aligned inverted channel or ridge parts 64 interrupt the transverse corrugations, as at the bottom parts 58 and transverse upright parts 60 with which they are formed integrally. Side walls 66 and end walls 68 are formed integral with and extend upwardly from the marginal portions 56 of the ridged unit and preferably terminate in out-turned top flanges 70 which lie in a common plane.

In the event wheel wells of sealed character are desired, the construction as here illustrated may be formed. In this construction, the transverse corrugations or ridges are terminated spaced inwardly from the opposite side walls 66 and a wheel well consisting of inner side wall 72, top wall 74, and front and rear walls 76 is provided. It will be understood that these wheel wells may be molded integrally with the remainder of the configured chassis unit 50 so as to retain the inherent strength desired in the unit.

A molded chassis unit will preferably be provided with metal reinforcement for increased strength thereof. Thus, longitudinally extending metal reinforcements 78 may be imbedded in the lower portions of the side walls 66 and end wall 68, preferably adjacent to the shoulder portions 66 thereof. Such reinforcements will preferably follow the contour of the wheel wells as illustrated in FIG. 5. Additional strength may be imparted to the unit by imbedding metal reinforcement members 80 in the top flanges 70.

In the assembly of the chassis, a floor panel 52 is selected which is of a size and shape to fit snugly within the chassis unit 50 so as to rest marginally upon the shoulders 56 of the chassis unit. When wheel wells are provided, the floor panel is cut-away, as at 82, to fit around such wheel wells. The floor panel, preferably formed of plywood as previously described, is bonded or cemented, as by epoxy cement, substantially continuously to all parts of the molded chassis unit which it contacts, that is at surfaces 54 and 56.

The same advantages of low cost, light weight, high strength, and of rigidification of the underlying supporting structure by the floor panel, which have been described above, characterize this embodiment.

I claim:
1. A vehicle chassis construction comprising
   a unit including a member formed of sheet material configured to provide integral transverse corrugations having a plurality of substantially uniformly spaced parallel transverse portions lying in substantially a common plane, at least one continuous longitudinal reinforcing corrugation interrupting and intersecting said transverse corrugations, and longitudinal marginal members having portions in said common plane, and
   a rigid floor panel bearing upon and substantially continuously connected to the parts of said unit at said common plane,
said member being formed of sheet metal longitudinally notched to receive a comparatively shallow metal channel welded thereto and having at least one flange lying in said common plane and cemented to said floor panel.
2. A vehicle chassis construction comprising
   a unit including a member formed of sheet material configured to provide integral transverse corrugations having a plurality of substantially uniformly spaced parallel transverse portions lying in substantially a common plane, at least one continuous longitudinal reinforcing corrugation interrupting and intersecting said transverse corrugations, and longitudinal marginal members having portions in said common plane, and
   a rigid floor panel bearing upon and substantially continuously connected to the parts of said unit at said common plane,
said member having cut-outs at opposite sides to define wheel-receiving openings,
said marginal members spanning said cut-outs and .
a longitudinal corrugation extending adjacent to the inner longitudinal margin of each cut-out.
3. A vehicle chassis construction comprising
   a unit including a member formed of sheet material configured to provide integral transverse corrugations having a plurality of substantially uniformly spaced parallel transverse portions lying in substantially a common plane, at least one continuous longitudinal reinforcing corrugation interrupting and intersecting said transverse corrugations, and longitudinal marginal members having portions in said common plane, and
   a rigid floor panel bearing upon and substantially continuously connected to the parts of said unit at said common plane,
said unit being molded from synthetic resin material and including integral side and end walls projecting above said common plane and marginal shoulders in said common plane supporting and cemented to the floor.
4. A vehicle chassis construction comprising
   a unit including a member formed of sheet material configured to provide integral transverse corrugations having a plurality of substantially uniformly spaced parallel transverse portions lying in substantially a common plane, at least one continuous longitudinal reinforcing corrugation interrupting and intersecting said transverse corrugations, and longitudinal marginal members having portions in said common plane, and a rigid floor panel bearing upon and substantially continuously connected to the parts of said unit at said common plane, said unit being molded and having integral side and end walls projecting above said common plane, said corrugated portion being interrupted at limited portions of each side by integral upwardly offset wheel-well-defining portions.

References Cited

UNITED STATES PATENTS

| | | | |
|---|---|---|---|
| 1,191,863 | 7/1916 | Williams | 52—630 |
| 1,605,513 | 11/1926 | Connery | 52—630 X |
| 2,836,267 | 5/1958 | Reinhold | 52—618 X |
| 3,080,267 | 3/1963 | Schmalz. | |
| 3,163,435 | 12/1964 | Krueger et al. | |
| 3,217,845 | 11/1965 | Reynolds et al. | 52—618 X |
| 3,282,603 | 11/1966 | Barth. | |

FOREIGN PATENTS 738,287  10/1965  Great Britain.

LEO FRIAGLIA, Primary Examiner

J. A. PEKAR, Assistant Examiner

U.S. Cl. X.R.

52—618